US012656640B2

(12) United States Patent
Ma et al.

(10) Patent No.: US 12,656,640 B2
(45) Date of Patent: Jun. 16, 2026

(54) DISPLAY SCREEN

(71) Applicant: HUIZHOU TCL MOBILE COMMUNICATION CO., LTD., Huizhou (CN)

(72) Inventors: Jitao Ma, Huizhou (CN); Zhuwei Qiu, Huizhou (CN); Ping Chen, Huizhou (CN); Panwei Xiong, Huizhou (CN); Yang Yu, Huizhou (CN)

(73) Assignee: HUIZHOU TCL MOBILE COMMUNICATION CO., LTD., Huzhou (CN)

( * ) Notice: Subject to any disclaimer, the term of this patent is extended or adjusted under 35 U.S.C. 154(b) by 0 days.

(21) Appl. No.: 18/725,786

(22) PCT Filed: Nov. 11, 2022

(86) PCT No.: PCT/CN2022/131508
§ 371 (c)(1),
(2) Date: Jun. 30, 2024

(87) PCT Pub. No.: WO2023/130836
PCT Pub. Date: Jul. 13, 2023

(65) Prior Publication Data
US 2025/0102852 A1 Mar. 27, 2025

(30) Foreign Application Priority Data
Jan. 7, 2022 (CN) .......................... 202220041460.9

(51) Int. Cl.
G02F 1/1335 (2006.01)
F21V 8/00 (2006.01)
G02F 1/1333 (2006.01)

(52) U.S. Cl.
CPC ..... *G02F 1/133502* (2013.01); *G02B 6/0051* (2013.01); *G02F 1/133331* (2021.01)

(58) Field of Classification Search
CPC .............. G02B 6/001; G02F 1/133331; G02F 1/133502
See application file for complete search history.

(56) References Cited

U.S. PATENT DOCUMENTS 9,811,188 B1 * 11/2017 Subbarayan ............ G02F 1/167
11,966,117 B2 * 4/2024 Sasa .................. G02F 1/133606
(Continued)

FOREIGN PATENT DOCUMENTS

CN 2916696 Y 6/2007
CN 102081177 A 6/2011
(Continued)

OTHER PUBLICATIONS

International Search Report in International application No. PCT/CN2022/131508, mailed on Feb. 9, 2023.
(Continued)

*Primary Examiner* — Zheng Song
(74) *Attorney, Agent, or Firm* — PV IP PC; Wei Te Chung

(57) ABSTRACT

A display screen applied to a display device is provided. The display screen includes a cover plate structure and a backlight structure. The cover plate structure includes a cover plate layer and an optical coating layer. The optical coating layer comprises an anti-glare (AG) layer on a surface of the cover plate layer. The backlight structure is located on another surface opposite to the AG layer on the cover plate layer. The backlight structure includes a first diffusion layer and a second diffusion layer stacked on the first diffusion layer.

16 Claims, 1 Drawing Sheet

(56) References Cited

U.S. PATENT DOCUMENTS

| | | | | |
|---|---|---|---|---|
| 12,211,962 | B2 * | 1/2025 | Nakajima | B32B 27/306 |
| 2007/0205706 | A1 * | 9/2007 | Yamada | G02B 1/10 |
| | | | | 313/110 |
| 2010/0073611 | A1 * | 3/2010 | Tochigi | G02F 1/133502 |
| | | | | 359/601 |
| 2010/0309411 | A1 * | 12/2010 | Shibata | G02B 5/02 |
| | | | | 430/320 |
| 2014/0016348 | A1 * | 1/2014 | Iwasaki | G02B 6/0051 |
| | | | | 362/606 |
| 2018/0217300 | A1 * | 8/2018 | Boyd | G02B 3/005 |
| 2019/0079339 | A1 * | 3/2019 | Fujii | G02B 1/115 |
| 2021/0397049 | A1 * | 12/2021 | Allen | G02F 1/133524 |
| 2024/0069254 | A1 * | 2/2024 | Weindorf | G02B 1/118 |

FOREIGN PATENT DOCUMENTS

| | | | |
|---|---|---|---|
| CN | 207082090 | U | 3/2018 |
| CN | 111051972 | A | 4/2020 |
| CN | 210488187 | U | 5/2020 |
| CN | 112327394 | A | 2/2021 |
| CN | 214375721 | U | 10/2021 |
| CN | 113589583 | A | 11/2021 |
| CN | 113791505 | A | 12/2021 |
| CN | 217113690 | U | 8/2022 |
| CN | 217333044 | U | 8/2022 |
| JP | 2011095448 | A | 5/2011 |
| WO | 2017183498 | A1 | 10/2017 |
| WO | 2022178681 | A1 | 9/2022 |

OTHER PUBLICATIONS

Written Opinion of the International Search Authority in International application No. PCT/CN2022/131508, mailed on Feb. 9, 2023.

European Office Action issued in corresponding European Patent Application No. 22918288.6 dated Oct. 27, 2025, pp. 1-8.

* cited by examiner

100
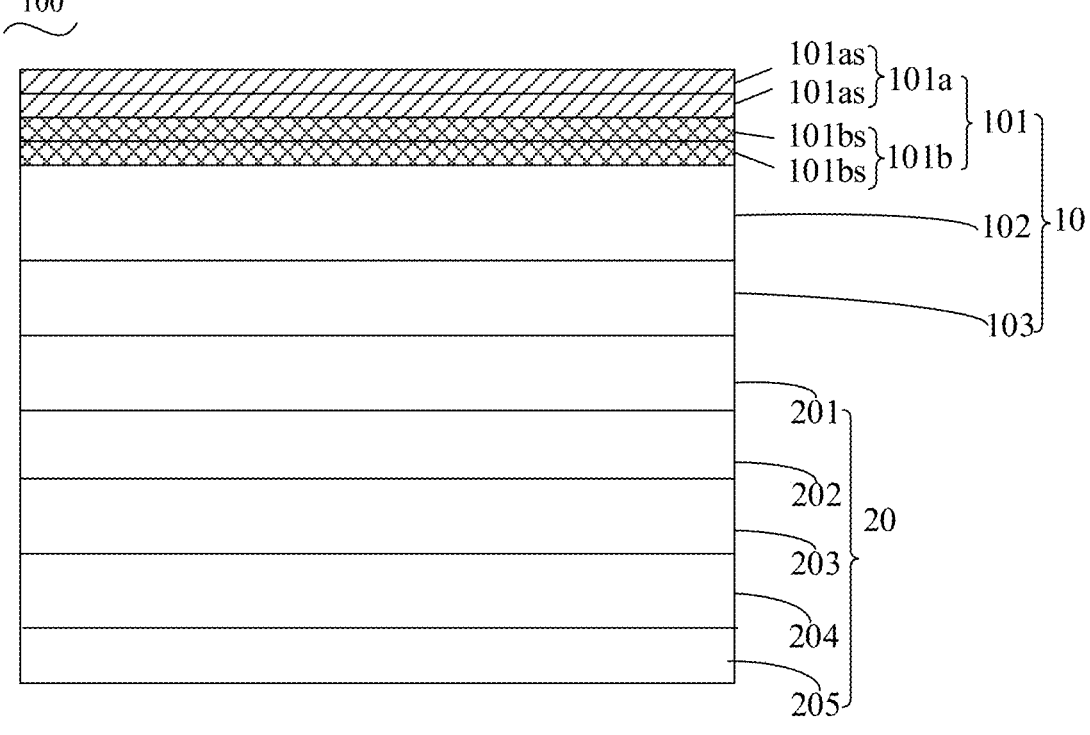
101as ⎤
101as ⎰ 101a ⎤
　　　　　　 ⎬ 101 ⎤
101bs ⎤　　 ⎦　　 ⎥
101bs ⎰ 101b　　　 ⎥
　　　　　　　　　 ⎬ 10
102 ⎰
　　 ⎥
　　 ⎥
103 ⎦
201 ⎤
　　 ⎥
202 ⎥
　　 ⎥
203 ⎬ 20
　　 ⎥
204 ⎥
　　 ⎥
205 ⎦

DISPLAY SCREEN

CROSS REFERENCE OF RELATED APPLICATION

This application is a US national phase application based upon an International Application No. PCT/CN2022/131508, filed on Nov. 11, 2022, which claims priority to Chinese Application No. 202220041460.9, entitled "DISPLAY SCREEN", filed on Jan. 7, 2022. The entire disclosures of the above applications are incorporated herein by reference.

FIELD OF THE INVENTION

The present disclosure relates to the technical field of display screens, specifically to a display screen.

BACKGROUND

Under the development trend of science and technology, electronic devices such as smart phones and tablets with display screens have become more and more people's pursuit. People can play video game, watch videos, play music, communicate and purchase product through these electronic devices. When people use these electronic devices, the display screen on the electronic devices interact with users and have a direct impact on the user.

The existing electronic device pursues display brightness. However, the increase of display brightness bringing about the increase of LED blue light intake, causes damage to human eyes. Simultaneously, in the case of indoor fluorescent lamp, table lamp, sunlight, glass reflection and the like, there is a problem of glare caused by complex light illuminating the surface of the display screen, and it is easy to cause user eye fatigue.

SUMMARY

Technical Problem

At present, the display screen is improved by designing the AG cover plate, and the complex ambient light is evenly distributed through diffuse reflection, so as to make the display picture soothing and alleviate the problem of eye fatigue of users, but this way makes the display screen appear white.

Solution to Technical Problem

Technical Solution

The embodiment of the present disclosure provides a display screen to solve the problem of display screen whitening while realizing the display brightness softness and the display picture being soothing.

An embodiment of the present disclosure provides a display screen applied to a display device. The display screen includes a cover plate structure and a backlight structure.

The cover plate structure includes a cover plate layer and an optical coating layer. The optical coating layer comprises an anti-glare (AG) layer on a surface of the cover plate layer.

The backlight structure, located on another surface opposite to the AG layer on the cover plate layer, includes a first diffusion layer and a second diffusion layer stacked on the first diffusion layer.

Optionally, the cover plate structure further comprises an AR layer, and the AR layer is located between the cover plate layer and the AG layer.

Optionally, the AR layer comprises a number of superimposed sub-AR layers.

Optionally, the AG layer comprises a sub-AG layer in which several layers are superimposed.

Optionally, the first diffusion layer and the second diffusion layer are diffusers.

Optionally, the cover plate structure further comprises a touch layer, and the touch layer is located between the cover plate layer and the backlight structure.

Optionally, the backlight structure further comprises an optical adhesive layer and a display layer, wherein the optical adhesive layer is located between the touch layer and the display layer.

Optionally, the display layer is located between the optical adhesive layer and the first diffusion layer, and the display layer and the second diffusion layer are respectively located on two sides of the first diffusion layer.

Optionally, the backlight structure further comprises a light guide layer, and the second diffusion layer is located between the first diffusion layer and the light guide layer.

Optionally, the backlight structure further comprises a backlight source, and the backlight is located on one side close to the light guide plate.

Beneficial Effect of Present Disclosure

Advantageous Effect

The embodiment of the present disclosure provides, after the light is emitted from the apparatus, through the action of the first diffusion layer and the second diffusion layer, the brightness of the display screen is soft. Because of the setting of the AG layer, the reflection of external stray light is limited, so that the brightness of the display screen of the display screen is not disturbed by the external stray light, the display picture is soothed, and the display does not produce the phenomenon of whitening.

BRIEF DESCRIPTION OF THE DRAWINGS

Description of the Drawings

In order to more clearly illustrate the technical solutions in the embodiments of the present disclosure, the drawings required to be used in the description of the embodiments will be briefly introduced below, and it is obvious that the drawings described below are only some embodiments of the present disclosure, and for those skilled in the art, other drawings can be obtained according to these drawings without creative labor.

FIG. 1 is a schematic diagram of the structure of a display screen according to an embodiment of the present disclosure.

Refer to FIG. 1, 100 indicates a display screen, 10 indicates a cover plate structure, 101 indicates an optical coating layer, 102 indicates a cover plate layer, 103 indicates a touch layer, 20 indicates a backlight structure, 201 indicates an optical adhesive layer, 202 indicates a display layer, 203 indicates a first diffusion layer, and 204 indicates a second diffusion layer, and 205 indicates a light guide layer.

EMBODIMENT OF THE PRESENT DISCLOSURE

Detailed Description of the Present Disclosure

The technical solutions in the embodiments of the present disclosure will be clearly and completely described below in conjunction with the accompanying drawings in the embodiments of the present disclosure, and it is obvious that the described embodiments are only part of the embodiments of the present disclosure, not all embodiments. Based on the embodiments in the present disclosure, all other embodiments obtained by a person skilled in the art without creative work fall within the scope of protection of the present disclosure.

In the description of the present disclosure, it is noted that, unless otherwise expressly specified and qualified, the terms "mounted", "connected", "connected" shall be construed broadly, for example, they may be fixed, detachable, or integrally connected. It can be mechanically connected, electrically connected or can communicate with each other. It can be directly connected or indirectly connected through an intermediate medium, it can be the internal connection of two elements or the interaction relationship between two elements. When a component is said to be "fixed" to a component, it can be directly on top of another component or it can exist as a centered component. For those of ordinary skill in the art, the specific meaning of the above terms in the present disclosure may be understood on a case-by-case basis.

The disclosure below provides a number of different embodiments or examples to implement the different structures of the present disclosure. In order to simplify the disclosure of the present disclosure, the parts and settings for specific examples are described below. Of course, they are only examples and are not intended to limit the present disclosure. In addition, the present disclosure may repeat reference numbers and/or reference letters in different examples, and this repetition is for the purpose of simplification and clarity and does not in itself indicate the relationship between the various embodiments and/or settings in question. In addition, the present disclosure provides examples of various specific processes and materials, but those of ordinary skill in the art may be aware of the application of other processes and/or the use of other materials.

The embodiment of the application provides a display screen, by coating or etching anti-glare (AG) film on the cover plate, arranging multiple layers of diffusion layers superimposed on each other in the backlight module, diffusing the light through the diffusion layer, realizing brightness brightening, and limiting the reflection of external stray light through the AG film, so as to make the display picture more soothing, and avoid the problem of whitening of the screen.

Referring to FIG. 1 illustrating a schematic diagram of a display screen according to an embodiment of the present disclosure. The display screen 100 is applied to an electronics device with a display, e.g., a smart phone or a tablet computer, to realize a display function.

The display screen 100 comprises a cover plate structure 10 and a backlight structure 20 connected with the cover plate structure 10. The cover plate structure 10 is partly located outside the electronics device, a part is located inside the electronics device, and the backlight structure 20 is located in the electronics device.

The cover plate structure 10 is used for realizing the display function of the electronics device, so that the electronics device can play video and images. The backlight structure 20 is used for the display function of the cover plate structure 10 of the auxiliary equipment. Through the backlight structure 20, the display effect of the cover plate structure 10 can be better.

Further, the cover plate structure 10 comprises an optical coating layer 101, a cover plate layer 102 and a touch layer 103 connected in order.

The optical coating layer 101 comprises an AG layer, the AG layer has the effect of preventing reflection, and in order to prevent the reflection coating, a sub-AG film layer can be included, and a multilayer sub-AG film layer can also be multi-layered, and when the AG layer is a multi-layer film layer, the multi-layer sub-AG film layers are superimposed on each other.

Preferably, some parameter settings of the AG layer comprise: roughness is set to 0.2 um-0.45 um, gloss is set to 13GS-19GS, haze is set to 30%-50%, and transmittance is set to 68%-85%.

The above is only the preferred parameter setting range of the AG layer, in fact, the parameters of the AG layer can be set separately, and the parameter setting range of the AG layer is not limited herein.

Further, in the embodiment of the present disclosure, the optical coating layer 101 comprises an anti-glare (AG) layer 101a and an Anti-reflective (AR) layer 101b. The AG layer 101a has the effect of preventing reflection. The AR layer 101b connected with the AG layer 101a has the effect of increasing transmission.

The AR layer 101b may comprise a sub-AR film layer or may also comprise a multilayer sub-AR film layer. When the AR layer is a multilayer film layer, the sub-AR layers are superimposed on each other.

The cover layer 102 is a glass cover plate which is connected with the optical coating layer 101 and is positioned between the optical coating layer 101 and the touch layer 103.

In the process of fabrication, the AR layer 101b is coated on a surface of the cover plate layer 102, and the AG layer 101a is coated on the AR layer 101b. The AR layer 101b is located between the AG layer 101a and the cover layer 102.

In some embodiments, the AR layer 101b comprises a sub-AR layer, and the AG layer 101a comprises a sub-AG layer. The sub-AR layer is located between the cover plate layer 102 and the sub-AG layer.

In some embodiments, the AR layer comprises a plurality of sub-AR layers, and the AG layer comprises a sub-AG layer. The sub-AR layers are superimposed on each other and are positioned between the cover plate layers 102 and the sub-AG layers.

In some embodiments, the AR layer comprises a sub-AR layer, and the AG layer comprises a plurality of sub-AG layers. The sub-AG layers are superimposed on each other, and the sub-AR layers are located between the cover plate layers 102 and the superimposed sub-AG layers.

In some embodiments, the AR layer 101b comprises a plurality of layers of sub-AR layers 101bs, and the AG layer 101a comprises a plurality of layers of sub-AG layers 101as. The sub-AR layers 101bs of the layers are superimposed on each other, the sub-AG layers 101as of the layers are superimposed on each other, and the superimposed layers of the sub-AR layers 101bs_are located between the cover plate layers 102 and the superimposed layers of the sub-AG layers 101as.

It should be noted that in the embodiment of the present disclosure, there is no limit to the number of sub-AR layers and the sub-AG layer.

The touch layer 103 is a touch sensing layer of the display screen 100 and is used for sensing the signal of touch input. The touch layer 103 may be electrically connected with the control center of the electronics device. The signal of touch input is sent to the control center. The control center is controlled according to this signal, so as to realize the purpose of touch control.

The touch layer 103 is positioned between the cover plate layer 102 and the backlight structure 20. The cover plate layer 102 and the backlight structure 20 are connected.

The backlight structure 20 realizes the brightness of the display screen 100. The backlight structure 20 includes an optical adhesive layer 201, a display layer 202, a first diffusion layer 203, a second diffusion layer 204 and a light guide layer 205.

The optical adhesive layer 201 is used for realizing the connection with the cover plate structure 10. Specifically, the optical adhesive layer 201 is connected between with the touch layer 103 and the display layer 202.

Optionally, the optical adhesive layer 201 can be an optical clear adhesive (OCA).

The display layer 202 for displaying is a main structure of the electronics device to realize the display function, and is electrically connected with the control center of the electronics device.

The first diffusion layer 203 and the second diffusion layer 204 are both used for realizing the diffusion effect on light so as to improve the brightness of the display screen 100. The diffusion principle is to use the principle of diffusion of light rays by utilizing the surface roughness of the medium, and a gap substance that enhances the roughness is added to the structure to enhance the surface roughness and achieve a better diffusion effect.

It is understandable that the arrangement of the first diffusion layer 203 and the second diffusion layer 204 is also related to the degree of relaxation of the display screen 100.

Optionally, the first diffusion layer 203 may be a diffuser sheet, and the second diffusion layer 204 may also be another diffuser sheet.

In the embodiment of the present disclosure, the backlight structure 20 comprises a first diffusion layer 203 and a second diffusion layer 204. The first diffusion layer 203 and the second diffusion layer 204 are superimposed on each other. The first diffusion layer 203 is located on one side close to the display layer 202.

Preferably, some parameter settings of the first diffusion layer 203 comprise: haze is set to 80%-95%, transmittance is set to 50%-95%, and thickness is set to 0.06 mm-0.15 mm.

The above is only the preferred parameter setting range of the first diffusion layer 203, in fact, the parameters of the first diffusion layer 203 can be set separately, and the parameter setting range of the first diffusion layer 203 is not limited.

Preferably, some parameter settings of the second diffusion layer 204 comprise: haze is set to 80%-95%, transmittance is set to 50%-95%, and thickness is set to 0.06 mm-0.15 mm.

The above is only the preferred parameter setting range of the second diffusion layer 204, in fact, the parameters of the second diffusion layer 204 can be set separately, and the parameter setting range of the second diffusion layer 204 is not limited.

In other embodiments, the backlight structure 20 comprises a first diffusion layer 203, a second diffusion layer 204 and a third diffusion layer. The first diffusion layer 203, the second diffusion layer 204 and the third diffusion layer are superimposed on each other, the second diffusion layer 204 is located between the first diffusion layer 203 and the third diffusion layer, and the first diffusion layer 203 is located on one side close to the display layer 202.

Preferably, some parameter settings of the first diffusion layer 203 comprise: haze is set to 80%-95%, transmittance is set to 50%-95%, and thickness is set to 0.06 mm-0.15 mm.

The above is only the preferred parameter setting range of the first diffusion layer 203, in fact, the parameters of the first diffusion layer 203 can be set separately, and the parameter setting range of the first diffusion layer 203 is not limited.

Preferably, some parameter settings of the second diffusion layer 204 comprise: haze is set to 90%-95%, and transmittance is set to 85%-90%.

The above is only the preferred parameter setting range of the second diffusion layer 204, in fact, the parameters of the second diffusion layer 204 can be set separately, and the parameter setting range of the second diffusion layer 204 is not limited.

Preferably, some parameter settings of the third diffusion layer comprise: haze is set to 90%-95%, and transmittance is set to 85%-90%.

The above is only the preferred parameter setting range of the third diffusion layer, in fact, the parameters of the third diffusion layer can be set separately, and the parameter setting range of the third diffusion layer is not limited herein.

Optionally, in other embodiments, the backlight structure 20 may include a plurality of other layers of diffusion layers, and herein, the number of diffusion layers of the backlight structure 20 is not limited.

The light guide layer 205 can be light guide plate. The operating principle of the light guide layer 205 is to utilize optical grade acrylic plate to absorb the light emitted from the lamp to stay on the surface of optical grade acrylic plate. When the light hit each light guide dot, the reflected light can diffuse to all angles, destroy the reflection condition and shoot out by the light guide plate front. Setting up various sparse, light guide dots of different sizes, can make the light guide plate emit light uniformly.

In fact, the light guide layer 205 is used to achieve uniform light, so that the light emitted from inside the electronics device can be evenly emitted.

When the diffusion layer of the backlight structure 20 only comprises the first diffusion layer 203 and the second diffusion layer 204, the light enters the second diffusion layer 204 after passing through the light guide layer 205 for diffusion, and then enter the first diffusion layer 203 for diffusion.

Optionally, the backlight structure 20 further comprises a backlight source that may be an LED light-emitting diode. The backlight source is arranged inside the electronics device and is located on one side close to the light guide layer 205, that is, the backlight source and the second diffusion layer 204 are respectively located on two sides of the light guide layer 205.

The backlight is used for emitting light. The light passes through the light guide layer 205, the second diffusion layer 204 and the first diffusion layer 203 can make the display screen 100 more bright, so that the brightness of the display screen 100 is enhanced, and the display function of the display screen 100 is further realized.

The embodiment of the present disclosure provides a display screen 100, comprising a cover plate structure 10 and a backlight structure 20. The cover plate structure 10 comprises a cover plate layer 102 and an optical coating layer 101. The optical coating layer 101 comprises an AG layer which is coated on a surface of the cover plate layer 102. The backlight structure 20 is located on another surface opposite to the AG layer on the cover plate layer 102, and comprises a superimposed first diffusion layer 203 and a second diffusion layer 204. Through the above-mentioned structural design, after the light is emitted from the electronics device, through the effect of the first diffusion layer 203 and the second diffusion layer 204, the brightness of the display screen 100 is soft. Because of the setting of the AG layer, the reflection of the external stray light is limited, so that the brightness of the display screen 100 will not be disturbed by the external stray light, the display screen is soothed, and the display will not produce the phenomenon of whitening, and the problem that the display content is blurred due to the display whitening is avoided.

The technical features of the above embodiments may be arbitrarily combined, and for the sake of conciseness, all possible combinations of the technical features in the above embodiments are not described, however, as long as there is no contradiction between the combinations of these technical features, they shall be deemed to be within the scope of the present disclosure.

The above embodiments only express several embodiments of the present disclosure, and their descriptions are more specific and detailed, but this cannot be understood as a limitation on the scope of the patent of the present disclosure. It should be noted that, for a person of ordinary skill in the art, a number of variations and improvements can be made without departing from the conception of the present disclosure, which fall within the scope of protection of the present disclosure. Therefore, the scope of protection of the present disclosure shall be subject to the attached claims.

What is claimed is:

1. A display screen applied to a display device, comprising:

a cover plate structure, comprising a cover plate layer and an optical coating layer, wherein the optical coating layer comprises an anti-glare (AG) layer on a surface of the cover plate layer;

a backlight structure, located on another surface opposite to the AG layer on the cover plate layer, and comprising a first diffusion layer and a second diffusion layer stacked on the first diffusion layer; and wherein the backlight structure further comprises a light guide layer, a display layer, and an optical adhesive layer, and the second diffusion layer is positioned between the first diffusion layer and the light guide layer, wherein the first diffusion layer and the second diffusion layer are superimposed on each other, and the first diffusion layer is located on one side close to the display layer, wherein a haze of the first diffusion layer is set to 80%-90%, a transmittance of the first diffusion layer is set to 50%-95%, and a thickness of the first diffusion layer is set to 0.06 mm-0.15 mm.

2. The display screen of claim 1, wherein the cover plate structure further comprises an Anti-reflective (AR) layer between the cover plate layer and the AG layer.

3. The display screen of claim 2, wherein the AR layer comprises a plurality of superimposed sub-AR layers.

4. The display screen of claim 2, wherein the AR layer comprises a sub-AR layer, the AG layer comprises a sub-AG layer, and the sub-AR layer is located between the cover plate layer and the sub-AG layer.

5. The display screen of claim 2, wherein the AR layer comprises a plurality of sub-AR layers, and the AG layer comprises a sub-AG layer; the sub-AR layers are superimposed on each other and are located between the cover plate layer and the sub-AG layer.

6. The display screen of claim 2, wherein the AR layer comprises a sub-AR layer, and the AG layer comprises a plurality of sub-AG layers; the plurality of sub-AG layers superimposed on each other, and the sub-AR layer is located between the cover plate layer and the superimposed sub-AG layers.

7. The display screen of claim 2, wherein the AR layer comprises a plurality of layers of sub-AR layers, the AG layer comprises a plurality of layers of sub-AG layers, the sub-AR layers of the plurality of layers are superimposed on each other, the sub-AG layers of the layers are superimposed on each other, and the superimposed layers of the sub-AR layers are located between the cover plate layers and the superimposed layers of the sub-AG layers.

8. The display screen of claim 1, wherein the cover plate structure further comprises a touch layer between the cover plate layer and the backlight structure.

9. The display screen of claim 8, wherein the cover plate layer is a glass cover plate connected with the optical coating layer, and located between the optical coating layer and the touch layer.

10. The display screen of claim 1, wherein the AG layer comprises a plurality of superimposed sub-AG layers.

11. The display screen of claim 1, wherein the first diffusion layer and the second diffusion layer are diffuser sheets.

12. The display screen of claim 1, wherein the display layer is located between the optical adhesive layer and the first diffusion layer, and the display layer and the second diffusion layer are respectively located at two sides of the first diffusion layer.

13. The display screen of claim 1, wherein the backlight structure further comprises a backlight source on one side close to the light guide plate.

14. The display screen of claim 1, wherein a roughness of the AG layer is set to 0.2 um-0.45 um, a gloss of the AG layer is set to 13GS-19GS, a haze of the AG layer is set to 30%-50%, and a transmittance of the AG layer is set to 68%-85%.

15. The display screen of claim 1, wherein a haze of the second diffusion layer is set to 80%-95%, a transmittance of the second diffusion layer is set to 50%-95%, and a thickness of the second diffusion layer is set to 0.06 mm-0.15 mm.

16. The display screen of claim 1, wherein the backlight structure further comprises a third diffusion layer; the first diffusion layer, the second diffusion layer and the third diffusion layer are superimposed on each other, the second diffusion layer is located between the first diffusion layer and the third diffusion layer, and the first diffusion layer is located on one side close to the display layer.

* * * * *